Aug. 11, 1953 W. E. BRADLEY 2,648,722

ELECTRICAL SYSTEM FOR ALTERING PHASE DISPLACEMENT OF SEQUENTIAL-TYPE COLOR SIGNALS

Filed Feb. 15, 1951 2 Sheets-Sheet 1

INVENTOR.
WILLIAM E BRADLEY
BY Allen V. Hazeltine
ATTORNEY

INVENTOR.
WILLIAM E. BRADLEY
BY
Allen V. Hazeltine
ATTORNEY

Patented Aug. 11, 1953 2,648,722

UNITED STATES PATENT OFFICE 2,648,722

ELECTRICAL SYSTEM FOR ALTERING PHASE DISPLACEMENT OF SEQUENTIAL-TYPE COLOR SIGNALS

William E. Bradley, New Hope, Pa., assignor to Philco Corporation, Philadelphia, Pa., a corporation of Pennsylvania Application February 15, 1951, Serial No. 211,170

15 Claims. (Cl. 178—5.4)

The present invention relates to electrical systems by means of which a wave having discrete portions thereof indicative of each of a plurality of intelligence components arranged in given relative phase positions is converted into a wave having corresponding discrete portions arranged in relative phase positions different from the phase positions of the said portions of the first wave. The invention is particularly applicable to, and will be described in connection with, a color television system in which the video color signal wave for producing a color image at a receiving position is constituted by consecutive color signal components arranged in so-called "dot-sequential" formation.

In the so-called "dot-sequential" system for transmitting a color television image, the image to be transmitted is analyzed dot-by-dot by means of a sampling technique producing a series of pulses of video signal energy with the amplitude of each such pulse being determined by the ordinate of the video signal at the precise instant at which the pulse is developed. For example, three component color signals may be respectively developed by three separate camera tubes and the continuous signal produced by each of the camera tubes is sampled in some preferred manner so as to yield a component-color pulse train. By means of multiplexing, the three component-color pulse trains are interleaved into a composite-color pulse train. While this composite-color pulse train is amplitude modulated, nevertheless the amplitudes of adjacent pulses are independent, inasmuch as they represent separate chromatic aspects of the optical image.

The composite pulse train is then filtered by means of a suitable low pass filter and thereafter transmitted in any suitable manner.

Because of the frequency band limitation imposed by the low pass filter, the video wave produced at the transmitter in the above described system is effectively a sine wave superimposed on a D.-C. component. This sine wave has a frequency equal to the frequency at which the color signals are sampled and the D.-C. component and the amplitude and phase position thereof are determined by the magnitudes of the component-color pulses.

At the receiver position, the incoming video signal is supplied to a suitable sampling system by means of which there are derived therefrom the individual three color components each bearing the desired color information. Since in the transmitted video signal, the portions carrying the color information are in effect arranged in multiplex formation with equal time intervals between consecutive portions, the color component signals at the output of the sampling system of the receiver will be similarly arranged in time relationship so that a phase displacement of 120° will normally exist between the amplitude variations of one color component signal and the amplitude variations of the other color component signals.

It has been proposed to reassemble the color image at the receiver by means of a cathode-ray tube having a beam intercepting screen structure comprising laterally displaced vertical stripes of luminescent materials which respond to electron impingement to produce light of three different primary colors. These stripes are arranged in consecutive groups, each constituting a color triplet—i. e. each group comprising three vertical phosphor stripes producing light of different primary colors. The order of arrangement of the stripes may be such that normal, horizontal scanning by the cathode-ray beam of the tube produces red, green and blue light successively and the impingement of the beam on the phosphor stripes occurs in the same phase relationship as the relative phase position of the color component signals so that in effect the phosphor stripes of a given group bear a 120° phase position relationship to each other.

For proper color rendition, it is required that, as phosphor stripes producing each of the primary colors of light are impinged by the cathode-ray beam, the intensity of the beam be simultaneously controlled by the corresponding color component signal of the video wave image. To facilitate such synchronization, it has been proposed to provide the cathode-ray tube with an indexing system by means of which an indexing signal is produced indicative of the instantaneous position of the cathode-ray beam upon the image forming screen structure thereof.

The indexing signal may be derived from a plurality of stripe members each arranged on the beam intercepting screen structure between two adjacent groups of phosphor stripes and adapted to produce a detectable response in a suitable output system whenever the beam impinges thereon. Thus the index stripe members may comprise a material having secondary-emmissive properties which differ from the secondary-emissive properties of the remaining portions of the beam intercepting structure so that, as the beam scans the beam intercepting structure, the indexing member is excited and the resultant secondary emission produces an index signal in an output electrode of the tube. Alternately, the index stripe members may comprise a phosphor such as zinc oxide which emits light in the non-visible portion of the spectrum and the index signal may be derived from a suitable photoelectric element arranged, for example, in a side wall portion of the cathode-ray tube out of the path of the beam and facing the impinging surface of the screen structure.

Since the indexing stripe is positioned between adjacent color triplets the geometrical symmetry of the cathode-ray tube system no longer corresponds to the electrical symmetry of the color component signals of the video wave. More particularly, whereas the color component signals of the video wave bear a 120° phase displacement relative to each other, the presence of an indexing stripe between adjacent groups of color triplets in the cathode-ray tube screen structure makes it unfeasible to maintain a corresponding geometrical spacing between the phosphor stripes of the color groups and in practice the phosphor stripes of one group and the adjacent index stripe have relative positions corresponding to approximately 90° phase displacements between adjacent stripes.

This difficulty may be avoided by converting each of the color component signals into a continuously varying signal by means of suitable integrating networks coupled to the respective outputs of the sampling system and thereafter re-sampling the integrated signals in a sequence and at relative time intervals in synchronism with the instantaneous position of the cathode-beam as it impinges on the phosphor stripes of each color triplet. More particularly, in a tube system in which the phosphor stripes occupy positions corresponding to 90°, 180°, and 270° phase positions relative to the indexing stripe, the integrated primary color vodeo signals are consecutively resampled at instants corresponding to 90°, 180° and 270°. None of the integrated voltages are sampled at instants corresponding to 0°, at which instant the cathode-ray beam impinges on the indexing stripe associated with the adjacent color stripe group. However, in view of the auxiliary integrating and sampling systems required, the above described system for converting color component signals having effectively 120° phase relationship into corresponding components having 90°, 180° and 270° phase relationships respectively, is costly and space consuming.

It is an object of the invention to provide an improved system by which a wave containing information arranged at intervals bearing a given phase relationship may be converted into a signal voltage containing the said information arranged at intervals bearing a phase relationship different from said given phase relationship.

A further object of the invention is to provide a color television receiving system which is responsive to an input video wave constituted by color component signals having a given phase relationship and occurring in a given sequence and which system is applicable for supplying a color image reproducing system energized by a video wave having color component signals having a phase relationship and sequence different from the relative phase and sequence of the color component signals of the input video wave.

Another object of the invention is to provide a color television receiving system for converting a video wave basically constituted by consecutive substantially contiguous groups of pulses—the pulses of each group having intensity values corresponding to the intensity values of three primary color components of a color image, into a video wave basically constituted by spaced groups of pulses, each pulse being indicative of the relative intensities of the said primary color components of the video wave.

A specific object of the invention is to provide a system for converting a video wave basically constituted by groups of color component pulses interleaved in 120° phase position relative to each other into a video wave in which said color component pulses are arranged in 90°, 180° and 270° phase position Another object of the invention is to provide a pulse position conversion system characterized by low cost and low overall space requirements.

These and further objects of the invention will appear as the specification progresses.

In accordance with the invention the foregoing objects are achieved by means of a conversion system in which a signal wave having discrete portions thereof indicative of intelligence components arranged in given phase relationship and occurring during a given time interval is so modified that the said intelligence components are advanced in phase position relative to the position of one of the components whereby a new phase position distribution of the components is produced during the said given time interval. More specifically, and in a color television system to which the invention is particularly applicable, an input video wave having discrete portions thereof each indicative of the intensities of one of three primary color components of an element of the television image and arranged in 120° phase position relative to each other, is converted into a video wave having for each period thereof corresponding discrete portions arranged in 90°, 180° and 270° relative phase positions. For so modifying the video wave there is provided in accordance with the invention, a delay system to which the input video wave is applied and which is so constituted that a plurality of individual video voltages similar to the input video wave and having predetermined phase relationships may be obtained therefrom. The individual video voltages so produced are applied to a sampling system which is actuated at given phase intervals and in given sequence and by combining the samples so obtained, the desired modified video wave is produced at the output of the sampling system.

The invention will be described in greater detail with reference to the appended drawings forming part of the specification and in which.

Figure 1:
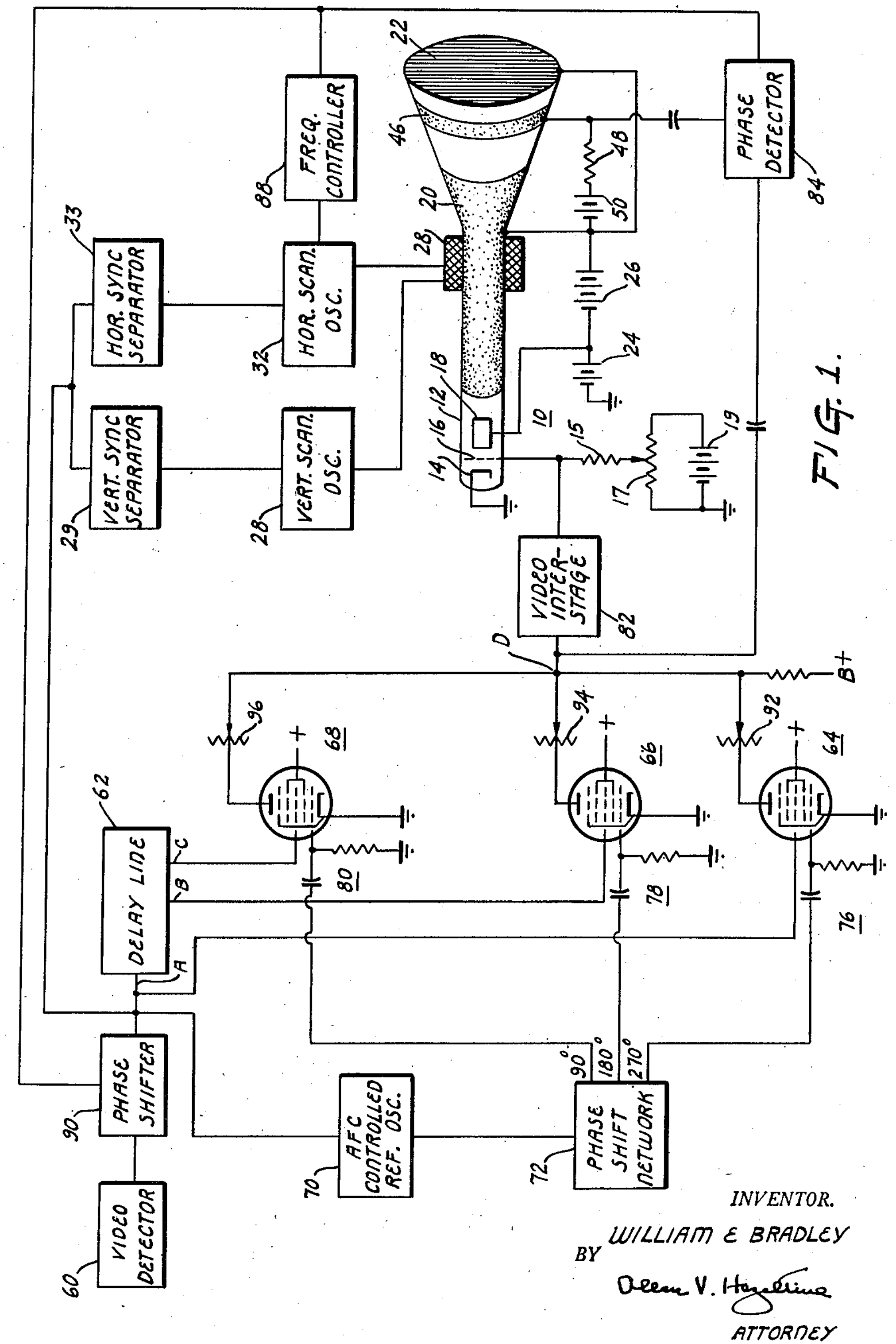
Figure 1 is a schematic diagram of a color television system in accordance with the invention and embodying a single cathode-ray tube for producing a color image.

Referring to Figure 1, the system there shown comprises a cathode-ray tube 10 containing within an evacuated envelope 12, a conventional beam generating and accelerating electrode system comprising a cathode 14, a control electrode 16 for varying the intensity of the beam, a first anode or focusing electrode 18, and a beam accelerating electrode 20 which may consist of a conductive coating on the inner wall of the envelope and which terminates at a point spaced from the end face 22 of the tube in conformance with well-established practice. Suitable heating means (not shown) are provided for maintaining the cathode 14 at its operating temperature. The electrode system so defined is energized by a suitable source of potential shown as a battery 24 having its negative pole connected to ground and its positive pole connected to the anode 18 and by a battery 26 connected in series with the battery 24 and having its positive pole connected to the accelerating electrode 20. In practice the battery 24 has a potential of 1 to 3 kilovolts whereas the battery 26 has a potential of the order of 10 to 20 kilovolts. The control grid 16 is connected through a resistor 15 and a potentiometer 17 to a battery 19 by means of which a steady state bias voltage is applied to the control grid.

A deflection yoke 28 coupled to a vertical deflection circuit 30 of conventional design and to a horizontal deflection circuit 32 later to be more fully described, is provided for deflecting the generated electron beam across the face plate 22 of the cathode-ray tube to form a raster thereon. The scanning oscillators 28 and 32 are coupled to a vertical synchronizing pulse separator 29 and a horizontal synchronizing pulse separator 33 respectively, of conventional design.

Figure 2:
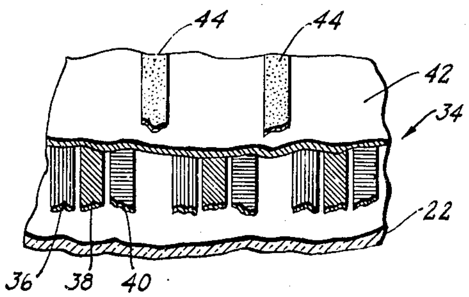
Figure 2 is a plan view partly broken away of a portion of the image forming screen structure of the cathode-ray tube embodied in the arrangement of Figure 1.

The end face plate 22 of the tube may be provided with a beam intercepting structure 34 a portion of which is shown in detail in Figure 2. In the arrangement shown in Figure 2 the structure 34 is formed directly on the face plate 22, however, it should be well understood that the structure 34 may be formed on a suitable light tanrsparent base which is independent of the face plate 22 and may be spaced therefrom. In the arrangement shown, the end face plate 22 which in practice consists of glass having preferably substantially uniform transmission characteristics for the various colors in the visible spectrum, is provided with a plurality of spaced groups of elongated parallel arranged stripes 36, 38 and 40 of phosphor material which, upon impingement of the cathode beam, fluoresce to produce light of three different primary colors. For example, the stripe 36 may consist of a phosphor which upon excitation produces red light, the stripe 38 may consist of a phosphor which produces green light and the stripe 40 may consist of a phosphor which produces blue light. Each of the groups of stripes may be termed a color triplet and, as will be noted, the sequence of the stripes is repeated in spaced groups and in consecutive order across the area of the structure 34. Suitable materials constituting the phosphor stripes 36, 38 and 40 are well known to those skilled in the art as well as the method of applying the same to the face plate 22 and further details concerning the same are believed to be unnecessary.

The screen structure 34 further comprises a thin electron permeable conducting layer 42 of low electron emissivity. The layer 42 is arranged on the phosphor stripes 36, 38 and 40 and preferably constitutes a mirror for reflecting light generated at the phosphor stripes. In practice the layer 42 is a light reflecting aluminum coating which is formed in well known manner.

Arranged on the coating 42 and spaced between adjacent groups of color stripes are indexing stripes 44 which may consist of a material having a secondary-emissive ratio detectably different from that of the material of coating 42. The stripes 44 usually of gold, may consist of other high atomic number metals such as platinum or tungsten or of a mixture containing cesium oxide.

The beam intercepting structure so constituted is connected to the positive pole of the battery 26 by means of a suitable lead attached to the aluminum coating 42.

Interposed between the end of the accelerating anode 20 and the beam intercepting structure 34 is an output collector electrode 46 consisting of a ring shaped coating for example, of graphite or of silver, on the wall of the envelope. Electrode 46 is energized through a load resistor 48 by a suitable source 50, shown as a battery. The source 50 may have a potential of the order of 3 kilovolts.

The purpose of the indexing stripe 44 and collector electrode 46 will be set forth more fully later.

The video wave for producing a color image on the screen structure of the cathode-ray tube 10 is derived from a video detector 60 of a television receiver. In conformance with present practice as applied to a dot-sequential system for color television, the video wave is a composite wave comprising component signals representing the magnitudes of the three primary color components of the televised image interleaved in a time multiplexing arrangement so that, during consecutive intervals during which the consecutive picture elements of the televised image are analyzed, each of these components consecutively occurs at a 120° phase position relative to the other components. While at the transmitter the component signals may be constituted initially by a series of pulses, the restriction of the frequency band of the video signal to a given maximum value by suitable low pass filters, in effect converts each of the component signals into a sine wave having a frequency equal to the frequency at which the primary color information is multiplexed and having a D.-C. component and amplitude variations corresponding to the brightness and brightness variations of the particularly primary color component of the image. The video wave transmitted is the sum of the component signals and may be considered to be a composite sine wave having a D.-C. component which is the sum of the D.-C. components of the primary color signals and having variations and phase position determined by the sum of the primary color sine waves. Such a composite video wave as transmitted and as derived from the video detector 60 is shown, for example, on an exaggerated scale as curve A in Figure 3. The wave embodies discrete portions representative of the red, green and blue color components of the color image as indicated by the letters R, G and B applied to the wave and by sampling the wave at the corresponding instants the original color information may readily be recovered. As will be noted, the instants indicative of the red, green and blue components of the video wave occur in electrical symmetry, that is to say, the portions of the wave carrying information pertaining to the three primary colors occur at phase positions displaced 120° relative to each other and each group constituted by a red, green and blue component is in effect contiguous to the adjacent group of red, green and blue components.

However, as previously pointed out, the screen structure 34 of the cathode-ray tube 10 (see Figure 2) is constituted by the phosphor stripes 36, 38 and 40 arranged with a phase position of 90° relative to each other for a given group and consecutive groups of phosphor stripes are spaced apart. Thus the red phosphor stripe 36 may be arranged about a central axis corresponding to a phase position of 90°, the green phosphor stripe may be centered about an axis corresponding to a phase position of 180° and the blue phosphor stripe about an axis corresponding to 270°. The color triplet is thus completed within a space corresponding to less than one period of the color information. The index stripe 44 is centered about an axis corresponding to 0° phase position and in effect, is arranged in the space between the groups of phosphor stripes.

In order to properly excite the screen 34 of the tube 10 it is necessary to adjust the phase positions of the color components of the video wave as derived from the detector 60 to correspond to the phase positions of the color stripes 36, 38 and 40. For this purpose and in accordance with the embodiment of the invention shown in Figure 1, there is provided a delay line 62 to which the video signal is applied, sampling tubes 64, 66 and 68, a reference oscillator 70, and a phase shift network 72.

Figure 3:
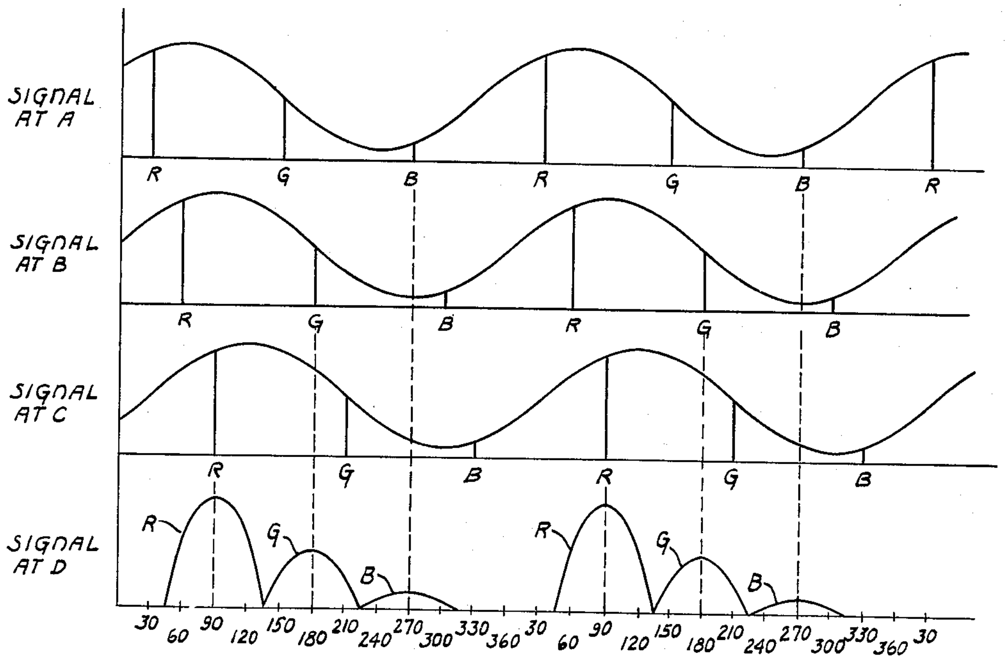
Figure 3 is a graph showing the various wave forms of the video waves in the system shown in Figure 1.

The delay line 62 may comprise a series of filter sections designed in accordance with principles well known in the art and is provided with tapping positions whereby three video waves having a phase displacement relative to each other may be provided. More particularly, and as shown in Figure 3, by means of the delay line 62, there are produced in addition to the video wave indicated by the reference A, two video waves indicated by the references B and C the latter waves being progressively phase displaced relative to the wave at A. In a system in which the color components of the video wave appear at consecutive intervals of 120° phase displacements and in which the phosphor stripes appear at consecutive 90° phase intervals with an interleaving interval between groups as in the specific example under consideration, the wave at B is delayed relative to the wave at A by approximately 30° and the wave at C is delayed relative to the wave at B by approximately 30°.

The sampling tubes 64, 66 and 68 operate to sample the waves A, B and C in a predetermined sequence. Sampling tube 64 may comprise a pentagrid vacuum tube which has its suppressor and cathode grounded, its second and fourth grids connected to a suitable source of positive screen potential, its third grid supplied with the video wave to be sampled and indicated by the reference A, its first grid supplied with a sampling signal for rendering the tube conductive only during predetermined portions of the sampling signal, and its plate connected to a source of positive potential designated B+ through a plate load resistor 74.

Sampling tubes 66 and 68 may be substantially identical with sampling tube 64, being supplied at their respective third grids with the video waves indicated by the references B and C, respectively, and having their respective plates connected to the source of potential B+ through the common plate load resistor 74. By supplying each of the sampling tubes at the first grids thereof, with sampling signals derived from the phase shift network 72 and whose positive peak values coincide in time with impingement of the corresponding color stripes arranged on the beam intercepting structure 34 of the cathode-ray tube 10, the sampling tubes are made conductive in consecutive order and an output voltage having color components arranged in proper sequence and phase intervals is produced across the load resistor 74. More particularly, if it is assumed for the moment that the sampling signal from the 90° tapping of the network 72 has its maximum positive peak value and that as shown in Figure 3 at this instant, the video wave indicated by the reference C has a phase position at which information exists concerning the red color component of the video wave, it will be seen that the tube 68 is made conductive during this instant and that a color pulse R as indicated at D is produced across the load resistor 74. Subsequently, at the instant when the sampling signal at the 180° tapping of the network 72 has a maximum peak value, the video wave indicated by the reference B has a phase position at which information exists concerning the green color component thereof and a color pulse G displaced by 90° from the color pulse R is produced across the load resistor 74. In similar manner, when the sampling signal at the 270° tapping network 72 has a maximum positive peak value the video wave indicated by the reference A has a phase position giving information concerning the blue color component thereof and a color pulse B displaced by 90° from the color pulse G is produced across the load resistor 74. At the instant corresponding to 0° none of the sampling signals has the required high positive value to make the sampling tubes conductive so that no information concerning the video wave is produced across the load resistor 74. During this period of nonconduction the anodes of the sampling tubes attain the potential of the B+ supply and this change in potential to the value of the B supply may be used as an index synchronizing pulse for purposes later to be more fully pointed out.

As above noted each of the sampling tubes 64, 66 and 68 is maintained non-conductive except during the period when a sampling signal from the network 72 and applied to the first grid thereof has a high positive peak value. This may be achieved by means of suitable resistance-capacitance networks contained in the first grid circuits of these tubes. More particularly, sampling tube 64 is provided with a resistance-capacitance network 76 having a time constant sufficiently long compared to the period of the sampling signal from the network 72, so that leveling upon peaks of the sampling signal supplied thereto takes place and conduction through the sampling tube 64 occurs only during a predetermined brief interval surrounding the time at which the sampling signal attains its peak values. Similar networks 78 and 80 are provided in the first grid circuits of the tubes 66 and 68 respectively.

The composite video wave produced across the load resistor 74 and having the distribution indicated at D in Figure 3, is applied in proper polarity to the control grid 16 of the cathode-ray tube 10 through an interstage amplifier 82 preferably having a band transmission characteristic whereby at least the frequency band of the video signal components and frequencies in the neighborhood of twice the repetition frequency of the color components are transmitted without significant attenuation.

The color components of the video wave applied to the delay line 62 and of the video wave produced across load resistor 74 bear a synchronous relationship. For proper color rendition, it is required that the beam impinge upon the phosphor stripes producing each of the primary colors of light in synchronism with the respective color component signals applied to the control grid and accordingly in synchronism with the color components of the input video wave. To achieve such a synchronous relationship, the system shown in Figure 1 is further provided with means to maintain the beam under positive control during its scan across the beam intercepting structure and means to suitably control the phase of the video signal prior to applying the same to the delay line 62. More particularly, by means of the index stripes 44 provided on coating 42 of the screen structure 34 (see Figure 2) the scanning of the cathode-ray beam across the beam structure produces at the collector electrode 46 and across the load resistor 48, an indexing voltage the peaks of which are indicative of the position of the beam as it impinges on the index stripes. Any non-uniformity of the velocity of the beam as it scans across the screen structure 34 or a non-uniformity in the distribution of the color triplets across the surface of the structure 34 will produce a corresponding change in the time position of the peaks of the indexing voltages. By means of a phase detector 84 the indexing voltage so produced is phase compared with the index synchronizing pulses appearing across the load resistor 74 as previously pointed out, to produce a control voltage indicative of departures from synchronism between the position of the beam and the occurrence of the color component signals of the input video wave. The so derived control voltage is applied to a suitable frequency controlling stage 88 coupled to the horizontal scanning oscillator 32 and is further applied to a variable phase shifting system 90 interposed between the video detector 60 and the delay line 62. By thus controlling both the horizontal scanning oscillator and the phase shifting system 90 it is ensured that absolute synchornism is achieved between the instant that the cathode-ray beam impinges on a given color phosphor stripe and the instant that the corresponding color component of the video wave is applied to the control grid 16. The construction of the phase detector 84, frequency controller 88 and the phase shifter 90 conform to standard practice and further description thereof is believed to be unnecessary.

In the above-described operation of the system, the sequence of the sampling signals and the spacing between color groups are such that the pulses developed across load resistor 74 and representing the red and blue color signals are spaced apart. In the event that the beam intercepting structure 34 of the cathode-ray tube 10 has its phosphor stripes so arranged that the spacing between groups takes place between green and blue phosphor stripes a corresponding co-relation of the color pulses may be achieved. This may be effected for example, by sampling the wave at C at the instant that it is indicative of the blue component thereof (at the 330° interval shown in Figure 3), wave B is sampled 90° later (at the 60° interval shown in Figure 3) and wave A is sampled 90° subsequent to the sampling of wave B (at the 150° interval shown in Figure 3). Similar considerations apply when each group of color pulses is to start with the green color component of the video signal.

Furthermore, in the operation of the system shown in Figure 1, the sequence of sampling by the tubes 64, 66 and 68 is such that the color pulses produced across load resistor 74 are in the same order of occurrence as the color components of the input video wave. However, it is apparent that the sequence of the color pulses across load resistor 74 may be made different from the sequence of the color components of the input video wave. More particularly, by a suitable choice of the tappings on the delay line 62 whereby the video waves at points B and C lag the video wave at point A by 150° and 300° respectively, and by sampling the waves at points C, B and A consecutively at 90° intervals as above described in connection with Figure 3 the sequence may be modified whereby wave C is sampled at the instant that it is indicative of the red color component thereof, wave B is sampled 90° later at which time wave B has a value indicative of the blue color component thereof, and wave A is sampled 90° later at which time wave A has a value indicative of the green color component thereof.

Moreover, while the conversion system of the invention has been described in its use with cathode-ray tubes in which the adjacent color stripes 36, 38 and 40 of each group bear a 90° relative phase position and the indexing stripe 44 is interposed between adjacent groups at a position corresponding to 0°, it will be evident that cathode-ray tubes having a distribution of the stripes 36, 38, 40 and 44 other than that above noted may be properly excited by a judicious selection of the tapping points of the delay line 62 and the phases of the sampling signals from the network 72. In some instances, even with a cathode-ray tube having color and index stripes interleaved with a uniform relative spacing it may be desirable to select tapping positions of the delay line other than the tapping positions indicated by a uniform spacing of the phosphor stripes for example, to compensate for departures of the color response of the material of the phosphor stripes, or to achieve a desired mixing of the color components of the video signal. In such instances the relative intensities of the color component signals from each of the sampling tubes, may be varied by suitable attenuation networks 92, 94 and 96 connected in the anode circuits of the sampling tubes 64, 66 and 68 respectively.

The repetition rate at which the video waves at A, B and C are sampled by the tubes 64, 66 and 68 in the above described system is the same as the repetition frequency of the color components of the video wave and is controlled by the reference oscillator 70. Thus, in a system in which the beam horizontally scans the screen structure 34 at a frequency of 15,750 cycles per second, in which the screen structure contains approximately 275 groups of color stripes corresponding to the usable video information when approximately 82% of the video signal is active, the color signal components of the video will have a repetition rate of approximately 2.67 megacycles per second when using so-called dot-interlacing principles, and the oscillator 70 will similarly operate at this frequency rate. The oscillator 70 may be held in synchronism and in proper phase relationship with the video wave by means of a suitable frequency and phase controlling element contained therein and actuated by the burst signals contained on the horizontal blanking pulses of the video wave. Such frequency and phase controlled oscillators are well known in the art and a further description thereof is believed to be unnecessary. However, for the sake of completeness, reference is made to a controlled oscillator system suitable for this purpose as described in the copending application of Joseph C. Tellier Serial Number 197,551 filed November 25, 1950.

In the operation of the system specifically shown in Figure 1 a unity ratio exists between the repetition rate of the color components of the video wave and the repetition rate of the color components derived from the sampling tubes 64, 66 and 68. In some instances, for example, when the screen structure of the cathode-ray tube contains a multiple of the number of groups of color stripes above noted, i. e. approximately 550 groups, it may be desirable to derive from the video wave a corresponding multiple number of groups of color component signals. This may be achieved by deriving from the delay line 62 a corresponding multiple number of video waves appropriately phased relative to each other and by sampling each of the so derived waves in proper sequence and at proper intervals. More specifically, to provide twice as many color component signals in the same spaced pattern above discussed in connection with Figure 1, the delay line 62 may be appropriately tapped to provide six video waves the second of which has a phase lag of 75° with respect to the first, the third of which lags the second by 75°, the fourth of which lags the third by 30°, the fifth of which lags the fourth by 75° and the sixth of which lags the fifth by 75°. By deriving from the phase shift network 72 six sampling signals having relative phase positions of 45°, 90°, 135°, 225°, 270° and 315° and actuating six sampling tubes of the above described type thereby in the sequence indicated, a video wave is produced in the common output circuit of the sampling tubes which is substantially the same as the wave shown at D in Figure 3 but which has twice the repetition frequency. Similarly, output video waves having color components appearing at other integral multiples of the repetition frequency of the color components of the input video wave may be produced by a suitable selection of the number of phase shifted waves derived from the delay line, the number of sampling tubes and the number and phase position of the sampling signals actuating the sampling tubes.

While I have described my invention by means of specific examples and in specific embodiments I do not wish to be limited thereto for obvious modifications will occur to those skilled in the art without departing from the spirit and scope of the invention.

What I claim is:

1. An electrical system comprising, input means for a source of a first wave having recurrent discrete portions thereof each indicative of the value of a given intelligence component and having the said portions arranged at time intervals spaced in accordance with a first given distribution, means to derive from said first wave a plurality of waves having predetermined phase displacements relative to each other and having recurrent portions thereof indicative of the said value of said components arranged at time intervals spaced in accordance with said first distribution, means to sample said derived waves in consecutive sequence at time intervals spaced in accordance with a second distribution different from said first distribution thereby to produce from said derived waves successively arranged intelligence components one from each of said derived waves, and means to combine said successively arranged components to produce an output wave having recurrent discrete portions thereof indicative of the value of each of said components arranged at time intervals spaced in accordance with said second given distribution.

2. An electrical system comprising, input means for a source of a first wave having recurrent discrete portions thereof each indicative of the value of a given intelligence component and having the said portions arranged in substantially contiguous groups and at substantially uniform time intervals between successive portions, means to derive from said first wave a plurality of waves having predetermined phase displacements relative to each other and having recurrent portions thereof indicative of the said value of said components arranged at substantially uniform time intervals, means to sample said derived waves in consecutive sequence at non-uniform time intervals arranged in spaced groups thereby to produce from said derived waves successively arranged intelligence components one from each of said derived waves, and means to combine said successively arranged components to produce an output wave having recurrent discrete portions thereof indicative of the value of each of said components arranged at time intervals spaced in accordance with the sampling periods of said sampling means.

3. An electrical system as claimed in claim 1 wherein the recurrent discrete portions of said first wave occur in a given sequence and the said derived waves have phase displacements relative to each other and to the spacing of said sampling periods at which the recurrent discrete portions of the output wave occur in a sequence different from the said given sequence.

4. An electrical system as claimed in claim 2 wherein the sampling intervals of the said sampling means occur at uniform periods within the duration of each of the said spaced groups.

5. An electrical system comprising, input means for a source of a first wave having recurrent discrete portions thereof each indicative of the value of a given one of three intelligence components and having the said portions arranged in substantially contiguous groups and at substantially uniform time intervals between successive portions, means to derive from said first wave three waves having predetermined phase displacements relative to each other and having recurrent portions thereof indicative of the said value of said components arranged at substantially uniform time intervals, means to sample said derived waves in consecutive sequence at non-uniform time intervals arranged in spaced groups thereby to produce from said derived waves three successively arranged intelligence components one from each of said derived waves, and means to combine said successively arranged components to produce an output wave having three recurrent discrete portions thereon indicative of the value of each of said components arranged in spaced groups of three and at time intervals spaced in accordance with the sampling periods of said sampling means.

6. An electrical system for reproducing a color television image comprising, a cathode-ray tube having a source of an electron beam, a control electrode for varying the intensity of said beam and a beam intercepting structure having portions thereof each comprising a plurality of stripes of fluorescent material, said stripes being arranged in accordance with a given geometrical distribution and each stripe producing light of a different color when said beam impinges thereon, input means for a source of a first video wave having recurrent discrete portions thereof each indicative of the value of a given color component of an element of said image and having the said discrete portions arranged at time intervals spaced in accordance with a second given distribution different from said geometrical distribution, means to derive from said first video wave a plurality of waves having predetermined phase displacements relative to each other and having recurrent portions thereof indicative of the said value of said components arranged at time intervals spaced in accordance with said second distribution, means to sample said derived waves in consecutive sequence at time intervals spaced in accordance with a third distribution corresponding to said geometrical distribution thereby to produce from said derived waves successively arranged intelligence components one from each of said derived waves, means to combine said successively arranged components to produce an output video wave having recurrent discrete portions thereof indicative of the value of each of said components arranged at time intervals spaced in accordance with said geometrical distribution, and means to apply said output video wave to said control electrode.

7. An electrical system for producing a color television image comprising, a cathode-ray tube having a source of an electron beam, a control electrode for varying the intensity of said beam and a beam intercepting structure comprising a plurality of spaced groups of stripes, the stripes of each of said groups and the spacing between adjacent groups defining a pattern of given geometrical distribution and each stripe producing light of a different color when said beam impinges thereon, input means for a source of a first video wave having recurrent discrete portions thereof each indicative of the value of a given color component of an element of said image and having the said discrete portions arranged in substantially contiguous groups and at substantially uniform time intervals between successive discrete portions, a delay line system for deriving from said first video wave a plurality of waves having predetermined phase displacements relative to each other and having recurrent portions thereof indicative of the said value of said components arranged at substantially uniform time intervals, means to sample said derived waves in consecutive sequence at non-uniform time intervals arranged in spaced groups in accordance with a distribution corresponding to said geometrical distribution thereby to produce from said derived waves successively arranged color components one from each of said derived waves, means to combine said successively arranged components to produce an output video wave having recurrent discrete portions thereof indicative of the value of each of said components arranged at time intervals spaced in accordance with a distribution corresponding to said geometrical distribution, and means to apply said output video wave to said control electrode.

8. An electrical system as claimed in claim 7 wherein the said stripes of each of said groups have a uniform distribution and the sampling intervals of the said sampling means occur at uniform periods within the duration of each of the said spaced groups.

9. An electrical system as claimed in claim 7 wherein the said stripes of each of said groups have a non-uniform distribution and the sampling intervals of said sampling means occur at corresponding non-uniform periods within the duration of each of the said spaced groups.

10. An electrical system as claimed in claim 7 wherein said first video wave comprises periodically occurring color synchronizing pulses and wherein said sampling means comprises a generator having means responsive to said synchronizing pulses for producing a sampling wave having a frequency synchronous with the recurrent frequency of said discrete portions and a fixed phase relative to said pulses, means to derive from said sampling wave a plurality of sampling signals having phase positions corresponding to said non-uniform time intervals, and a plurality of sampling tubes each energized by one of said derived waves and one of said sampling signals.

11. An electrical system for producing a color television image comprising, a cathode-ray tube having a source of an electron beam, a control electrode for varying the intensity of said beam, a beam intercepting structure having portions thereof spaced apart, each of said portions comprising a plurality of stripes of fluorescent material each stripe producing light of a different color when said beam impinges thereon and said beam intercepting structure having intermediate said first portions second portions comprising a material having a given response characteristic when said electron beam impinges thereon, and means to produce an output voltage indicative of the response characteristic of said second portions, the stripes of each of said first portions and the spacing between adjacent first portions defining a pattern of given geometrical distribution, means to periodically deflect said beam across said beam intercepting structure to thereby impinging said beam successively on said first and second portions, input means for a source of a first video wave having recurrent discrete portions thereof each indicative of the value of a given color component of an element of said image and having the said discrete portions arranged in substantially contiguous groups and at substantially uniform time intervals between successive discrete portions, a delay line system for deriving from said first video wave a plurality of waves having predetermined phase displacements relative to each other and having recurrent portions thereof indicative of the said value of said components arranged at substantially uniform time intervals, means to sample said derived waves in consecutive sequence at non-uniform time intervals arranged in spaced groups in accordance with a distribution corresponding to said geometrical distribution thereby to produce from said derived waves successively arranged intelligence components one from each of said derived waves, means to combine said successively arranged components to produce an output video wave having recurrent discrete portions thereof indicative of the value of each of said components occurring at time intervals arranged in spaced groups in accordance with a distribution corresponding to said geometrical distribution, means to apply said output video wave to said control electrode, and means responsive to said output voltage to control the impingement of said beam on a given stripe of said first portion in synchronism with the occurrence of the corresponding color component of said output video wave.

12. An electrical system as claimed in claim 11 wherein said output video wave comprises a pulse component interposed between said spaced groups of recurrent discrete portions, and wherein said means to control the impingement of the beam on a given stripe of said first portion in synchronism with the occurrence of the corresponding color component of said output video wave comprises a phase detector having an input circuit to which said pulse component and said output voltage are applied and an output circuit for producing a control potential proportional to phase differences between the said pulse component and the said output voltage, and a scanning wave generator coupled to said beam deflecting means and to said phase detector and having an operating frequency proportional to said control potential.

13. An electrical system as claimed in claim 11 wherein said output video wave comprises a pulse component interposed between said spaced groups of recurrent discrete portions, and wherein said means to control the impingement of the beam on a given stripe of said first portion in synchronism with the occurrence of the corresponding color component of said output video wave comprises a phase detector having an input circuit to which said pulse component and said output voltage are applied and an output circuit for producing a control potential proportional to phase differences between the said pulse component and the said output voltage, and a phase shifting system coupled to said input means of said first video wave for varying the phase of said video wave proportional to said control potential.

14. An electrical system as claimed in claim 1 further comprising means to vary the relative intensities of the successively arranged intelligence components derived from said sampling means.

15. An electrical system as claimed in claim 1 wherein said sampling means for said derived waves comprises means to produce sampling signals occurring at a rate which is an integer multiple of the rate of recurrence of the said discrete portions of said first wave.

WILLIAM E. BRADLEY.

References Cited in the file of this patent

UNITED STATES PATENTS

| Number | Name | Date |
|---|---|---|
| 2,529,485 | Chew | Nov. 14, 1950 |
| 2,530,325 | Huffman | Nov. 21, 1950 |
| 2,545,325 | Weimer | Mar. 13, 1951 |

OTHER REFERENCES

Recent Developments in Color Synchronization in the RCA Color Television System, Feb., 1950.